United States Patent [19]
Vogt

[11] Patent Number: 5,579,627
[45] Date of Patent: Dec. 3, 1996

[54] PROTECTIVE SUPPORT WRAP FOR A HORSE LEG

[76] Inventor: Les Vogt, 1279 W. Stowell, Unit H, Santa Maria, Calif. 93454

[21] Appl. No.: 386,470

[22] Filed: Feb. 10, 1995

[51] Int. Cl.$^6$ ........................................... B68C 5/00
[52] U.S. Cl. ........................................... 54/82
[58] Field of Search ........................... 54/82; 119/850

[56] References Cited

U.S. PATENT DOCUMENTS

| | | | |
|---|---|---|---|
| 2,512,925 | 6/1950 | Eggeman | 54/82 |
| 5,115,627 | 5/1992 | Scott | 54/82 |
| 5,152,285 | 10/1992 | Gnegy | 54/82 X |
| 5,363,632 | 11/1994 | Armato | 54/82 |

OTHER PUBLICATIONS

Photographic Illustration of Classic Equine Support Wrap (date unknown).

*Primary Examiner*—Robert P. Swiatek
*Attorney, Agent, or Firm*—Harrison & Egbert

[57] ABSTRACT

A protective support wrap for a lower leg of a horse including a panel having an inner layer and an outer layer, a first fastener affixed to the panel and extending outwardly therefrom, and a fetlock cradle sling strap having a first portion integrally connected to the panel and extending outwardly from an edge of the panel. The panel has a dimension suitable for wrapping around the lower leg of the horse. The first fastener is affixed to the outer layer of the panel when the panel is wrapped around the lower leg of the horse. The fetlock cradle sling strap has a fastener affixed to an end of the first portion opposite the side edge. The first portion of the fetlock cradle sling strap is integral with the outer layer of the panel. The first portion of the fetlock cradle sling strap extends outwardly from the side edge of the panel at an approximately forty-five degree angle. The inner layer is adhesively fastened in surface-to-surface contact with the outer layer. The upper and lower edges of the inner and outer layers are stitched together by cross-stitching.

17 Claims, 1 Drawing Sheet

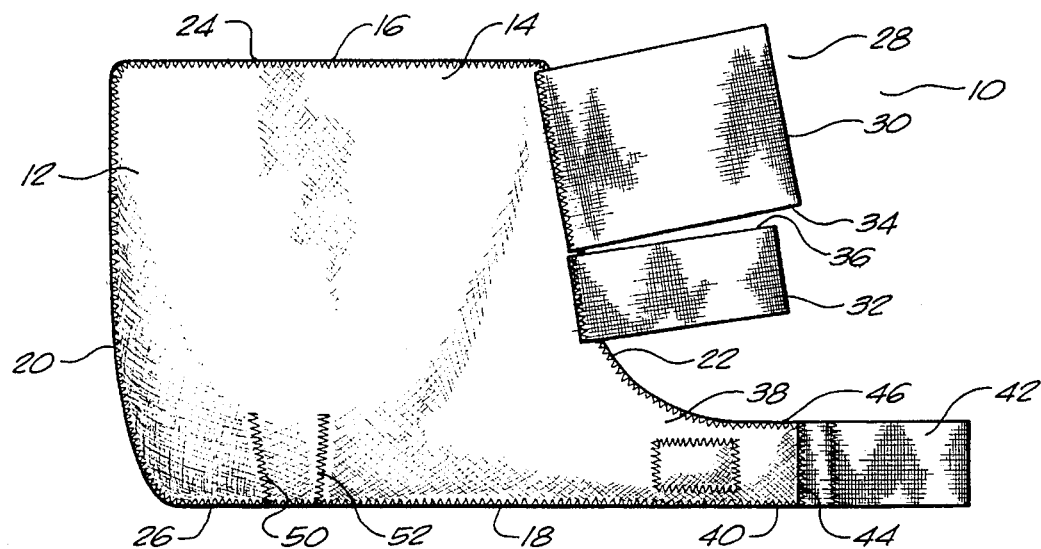

PROTECTIVE SUPPORT WRAP FOR A HORSE LEG

TECHNICAL FIELD

The present invention relates to in general to an athletic leg support for a horse and more specifically involves a wrap for a horse's lower leg with improved protection, support and shock dissipation characteristics.

BACKGROUND ART

Horses are highly susceptible to injury to the lower leg. Some injury results from external blows, such as by kicking. Athletic horses, particularly young race horses, often suffer injury to the tendon, fetlock, lower sesamoid bones, and suspensory ligament from the repeated hoof shock during running.

One particular problem is that the fetlock tends to drop as the lower suspensory ligaments fatigue, such as during a long ride such as a polo match or the like. This dropping of the fetlock exposes the sesamoid bones and suspensory ligaments in this crucial area to damage.

Another problem is the formation of wind puffs in the lower leg. Wind puffs are collections of fluid that can often be seen as bulges under the skin. Wind puffs interfere with healthy leg function and detract from performance.

To help alleviate these problems, conventionally, an athletic wrap or boot is placed on the distal limb of athletic horses to provide protection from trauma. The boot acts as a shield to prevent kicking and injury from interfering blows by the horse's other hoofs or legs. Additionally, the boot may provide significant energy absorption as the fetlock is extended. The more energy the boot absorbs, the less impact energy is available for tissue deformation and injury.

Conventional boots comprise a band of elastic material that is wrapped around the lower leg. There are a number of disadvantages to the band wrap boot. The efficacy of such wraps are very operator dependent in that if the wrap is too tight or too loose the wrap is ineffectual or may even cause more problems or damage. Such wraps do not dissipate energy sufficiently so as to act as a shock deadener. Such wraps pull the tendon toward the bone and into an unnatural position and do not provide good front support to the tendon. Such wraps tend to move during use of the leg. The wraps, being purely elastic tension members, only contact the outer high points of the leg and provide no pressure on tissue in indented areas. If the wrap becomes loose or unravels, it can cause injury to the horse and can even cause the horse to trip and fall, subjecting both horse and rider to serious injury.

U.S. Pat. No. 5,115,627, issued on May 26, 1992, to D. Scott describes a protective support wrap for a horse. In this patent, a wrap is provided for the horse's lower leg which includes a panel configuration adapted to wrap once around the leg from near the pastern to above the fetlock and to conform to the shape of the leg. The panel is comprised of an inner layer of shock dissipating material and an outer layer of elastic shock absorbing material. The inner layer is attached to the outer layer such that, upon wrapping, bulges created in the inner layer conform to the indentation between the tendon and bone so as to support them in their natural positions. An elastic support strap passes under the fetlock for additional support and is secured under the fetlock so that it will not move during the movement of the leg. This elastic support strap is an elastic strap which is sewn to an edge of the panel. The protective support wrap of this patent utilizes three VELCRO (TM) bindings extending at evenly spaced locations above the fetlock. Each of these VELCRO (TM) bindings have an edge which is stitched to the panel. Each of the VELCRO (TM) bindings is of approximately equal size and length.

In U.S. Pat. No. 5,115,627, the inner layer of material is sewn to the outer layer of material. This is carried out so that the inner layer will deform relative to the outer layer so as to conform to the leg indentations. Additionally, the vertical edges of the inner layer on the protective support wrap of U.S. Pat. No. 5,115,627 are indented from the vertical edges of the outer layer.

There are various problems with the protective support wrap of U.S. Pat. No. 5,115,627. First, and foremost, use of the elastic strap for the fetlock cradle sling strap pulls up on the fetlock joint at only one side. The fetlock cradle sling is attached or sewn to the shell of the boot at horizontal or a 90° angle so as to cause one-sided torque on the ankles and tendons of the horse. The application of this one-sided torque causes the ankle cartilage to quickly wear out. As such, there is a need to provide a protective support wrap which avoids this one-sided torque effect.

U.S. Pat. No. 5,115,627 has unsewn edges. Unfortunately, the edges of this protective support wrap have a tendency to "open" during the movement of the horse. This can allow dirt, and other infectious material, to enter in the area between the inner layer of the protective support wrap and the outer surface of the horse's leg. The use of several VELCRO (TM) straps in U.S. Pat. No. 5,115,627 applies pressure on the lower leg in increments. The multiple bindings also make removal and application of the wrap much more difficult. Multiple bindings create uneven tendon pressure and can cause injury to the tendons. In order to properly protect the lower leg of the horse, it is desirable to apply pressure evenly across the outer surface of the leg.

In U.S. Pat. No. 5,115,627, the inner layer is secured to the outer layer solely by stitching. As a result of this process, the inner layer has had a tendency to fold and wrinkle against the skin of the horse. This can cause abrasion and injury following continual use. If enough of the inner layer folds up against a tendon of the horse's leg, permanent damage to the leg and to the tendon can occur. Since the wrap of U.S. Pat. No. 5,115,627 stitches the vertical edges of the inner layer to the outer layer inwardly of the outer edges of the outer layer, there is a tendency for the inner layer to "roll" under the outer layer. Once again, this can cause abrasion or injury to the leg of the horse.

It is an object of the present invention to provide a protective support wrap that avoids one-sided torque effects on the ankle and tendons of the horse.

It is another object of the present invention to provide a protective support wrap that resists the intrusion of dirt and other infectious material.

It is another object of the present invention to provide a protective support wrap that applies pressure to the leg of the horse evenly over a wider area.

It is a further object of the present invention to provide a protective support wrap that can be easily applied and removed.

It is still another object of the present invention to provide a protective support wrap that avoids interior wrinkling, folding, and "roll under".

It is still a further object of the present invention to provide a deeper pocket that accommodates the ankle of the horse.

It is another object of the present invention to provide a protective support wrap to alleviate wrinkles caused by the fetlock cradle sling and to reduce injuries to the back of the fetlock.

It is still another object of the present invention to provide a protective support wrap that is easy to use, easy to manufacture, and relatively inexpensive.

These and other objects and advantages of the present invention will become apparent from a reading of the attached specification and appended claims.

SUMMARY OF THE INVENTION

The present invention is a protective support wrap for a lower leg of a horse that comprises a panel having an inner layer and an outer layer, a first fastener means affixed to the panel and extending outwardly therefrom, and a fetlock cradle sling strap having a first portion integrally connected to the panel and extending outwardly from an edge of the panel. The panel has a dimension suitable for wrapping around the lower leg of the horse. The first fastener means is suitable for affixing to the outer layer when the panel is wrapped around the lower leg. The fetlock cradle sling strap has a fastener and an end of the first portion opposite the side edge of the panel.

In the fetlock cradle sling strap, the first portion of the fetlock cradle sling strap is integral with the outer layer of the panel. The first portion and the fastener of the fetlock cradle sling strap are of a generally inelastic material. The first portion of the fetlock cradle sling strap has an upper edge extending outwardly from the edge of the panel at an approximately forty-five degree angle. The first fastener means includes a first strap of hook-and-loop material extending outwardly from the side edge of the panel generally adjacent an upper edge of the panel, and a second strap of a hook-and-loop material extending outwardly from the side edge of the panel below the first strap. The first strap has an area approximately twice the area of the second strap.

In the present invention, the inner layer is adhesively fastened in surface-to-surface contact with the outer layer. The inner layer, preferably, has adhesive extending across the entire surface joined to the outer layer. The upper edge of the inner layer is secured to the top edge of the outer layer by cross-stitching. Similarly, the lower edge of the inner layer is secured to the bottom edge of the outer layer by cross-stitching. The generally vertical side edges of the inner layer are stitched directly to the vertical side edges of the outer layer. The panel has a pair of pleats formed in the inner and outer layers generally adjacent to the bottom edge of the panel between the side edges. These pleats define an indented pocket in the panel for accommodating the ankle of the horse.

BRIEF DESCRIPTION OF THE DRAWINGS

FIG. 1 is an outer side elevational view of the protective support wrap of the present invention.

FIG. 2 is an inner side elevational view of the protective support wrap of the present invention.

FIG. 3 is a side elevational view showing the protective support wrap of the present invention as applied to the lower leg of a horse.

DETAILED DESCRIPTION OF THE INVENTION

Referring to FIG. 1, there is shown at 10 the protective support wrap for the lower leg of a horse. Specifically, in FIG. 1, the protective support wrap 10 is shown in its exterior view. The protective support wrap 10 comprises a panel 12 having a roughly rectangular configuration. It can be seen that the panel 12 has an outer layer 14. The inner layer of the panel 12 is illustrated in FIG. 2. This outer layer 14 is made of a closed cell neoprene material. The outer layer includes a top edge 16, a bottom edge 18, a first side edge 20 and a second side edge 22. The top edge 16 and the bottom edge 18 are in parallel relationship. The side edges 20 and 22 are of a generally vertical configuration.

In FIG. 1, it can be seen that the top edge 16 of the outer layer 14 is secured to the inner layer (shown in FIG. 2) at the top edge 16 by cross-stitching 24. Similarly, the bottom edge of the outer layer 14 is secured to the inner layer by similar cross-stitching 26. The use of the cross-stitchings 24 and 26 creates a "pucker" effect along these edges. As such, when the wrap 10 is extended around the lower leg of a horse, the top edge 16 and the bottom edge 18 will tend to draw in upon themselves so as to "seal" the top and bottom of the wrap 10. This "pucker" effect serves to prevent dirt, and other infectious material, from entering the area between the wrap 10 and the skin of the horse. The use of the term "cross-stitch", as used herein, does not include the overlock stitching.

In FIG. 1, it can be seen that a first fastener arrangement 28 is affixed to the panel 12 and extends outwardly from the second side edge 22. This fastener arrangement 28 serves to affix to the surface of the outer layer 14 when the panel 12 is wrapped around the lower leg of the horse. The fastener arrangement 28 includes a first strap 30 of hook-and-loop material and a second strap 32 of hook-and-loop material. The first strap 30 extends outwardly from the edge 22 of the panel 12 generally adjacent to the top edge 16. The second strap extends outwardly from the edge 22 below the first strap 30. The first strap 30 has an area approximately twice the area of the second strap 32. The lower edge 34 of the first strap 30 is in near proximity to the upper edge 36 of the second strap 32.

The configuration of the fastener arrangement 28 is a significant improvement over the prior art. The use of the large first strap 30, in combination with the smaller second strap 32, provides even pressure onto the horse's leg. There are no spaces between the straps that create an incremental pressure effect. It has been found that the application of the even pressure greatly facilitates the support of the horse's leg in a proper manner. The close proximity of the lower edge 34 and the upper edge 32 assures that the straps will be almost continuous when wrapped across the leg of the horse. The use of one large strap and one small strap greatly facilitates application and removal of the wrap 10.

A fetlock cradle sling strap 38 has a first portion 40 that is integrally connected to the panel 12 and extends outwardly from the edge 22 of the panel. A fastener 42 is affixed to an end 44 of the first portion 40 opposite the edge 22. Specifically, the first portion 40 of the fetlock cradle sling strap 38 is integral with the outer layer 14 of the panel 12. Importantly, The fastener 42 is made of an inelastic material. The first portion 40 has an upper edge 46 that extends, in a curved fashion, from the edge 22 of the outer layer 14 at an approximately forty-five degree angle. The fastener 42 is a strip of hook-and-loop material which allows the fetlock cradle sling strap 38 to be properly secured to the outer surface of the outer layer 14. In use, the fetlock cradle sling strap 38 is a significant improvement over the prior art. The fetlock cradle sling strap 38 is actually an integral part of the neoprene outer layer 14. This creates a wider fetlock support cradle. As a result, more reliable support and protection are provided while enhancing the appearance and adding durability to the wrap 10. The forty-five degree angle creates a sling strap effect upon the fetlock joint of the horse. Since the first portion 40 is elastic and the fastener 42 is of a generally inelastic material, the one-sided torque effect is avoided. When the fastener 42 is pulled upwardly at a forty-five degree angle, even pressures are applied to the fetlock Joint. As a result, unnecessary wearing of the cartilage is avoided.

It can be seen that a pair of pleats 50 and 52 is formed in the panel 12 generally adjacent to the bottom edge 18. The area between the pleats 50 and 52 is an indented pocket for accommodating the ankle of the horse. As a result, of this pleat, the wrap 10 is more form fitting. The use of the pleats 50 and 52 avoids the problem of wrinkling at the base of the ankle and also provides a deeper pocket than that of the prior art.

FIG. 2 shows the inner layer 60 of the panel 12. The inner layer 60 is of an ultra-shock material, such as closed cell foam. Importantly, the inner layer 60 is secured to the outer layer 14 by the application of adhesive over the entire area of the inner layer 60. The adhesive will extend across the entire area of the inner layer 60 between the inner layer 60 and the outer layer 14. The use of the adhesive strongly secures the inner layer 60 to the outer layer 14. This avoids the problems associated with the folding and wrinkling of the inner layer 60 against the skin of the horse. The use of the adhesive bonding of the inner layer 60 to the outer layer 14 avoids abrasion, injuries, and damage to the tendons of the horse's leg.

It can be seen in FIG. 2 that the upper edge 62 is secured by cross-stitching 24 to the upper edge 16 of the outer layer 14. Similarly, the lower edge 64 of the inner layer 60 is secured by cross-stitching 26 to the bottom edge 18 of the outer layer 14. There is no gap between the edges of the inner layer 60 and the edges of the outer layer 14. Similarly, the side edge 66 of the inner layer 60 is stitched directly to the side edge 20 of the outer layer 14. There is no gap or indentation between these edges. This arrangement avoids any "roll under" effect between the edges of the layers. Similarly, the other side edge 68 of the inner layer 60 is stitched directly to the second side edge 22 of the outer layer 14. In FIG. 2, it can be seen that the first strap 30 and the second strap 32 extend outwardly from the side edge 68. The fetlock cradle sling strap 38 extends outwardly from the side edge 68. The fasteners 30, 32, and 42 are shown as being of a hook-and-loop material. An additional square fastener 70 is provided along the fetlock cradle sling strap 38 to further enhance the ability to secure the wrap 10 around the leg of the horse.

The pleats 50 and 52 serve to create an indentation 72 adjacent the bottom edge 26 of the panel 12.

FIG. 3 shows the wrap 10 as applied around the leg 80 of a horse. In particular, it can be seen that the first strap 30 and the second strap 32 extend around the leg 80 of the horse. The ends of the straps 30 and 32 are received and are affixed to the outer surface of the outer layer 14 of panel 12. Importantly, it can be seen that the first strap 30 and the second strap 32 will reside in close proximity. There is an insignificant gap between the lower edge of the first strap 30 and the top edge of the second strap 32. As a result, the straps 30 and 32 provide even and uniform pressure against the leg 80 of the horse.

In FIG. 3, the fetlock cradle sling strap 38 extends downwardly from the side edge 22 so as to extend below the fetlock 82 and above the hoof 84 of the horse's leg 80. It can be seen that the opposite end 86 of the fetlock cradle sling strap 38 is affixed to the outer surface of the outer layer 14. The end 86 is drawn upwardly at an approximately forty-five degree angle. As such, the "sling" effect of the fetlock cradle sling strap 38 is provided.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A protective support wrap for a lower leg of a horse comprising:

a panel having an inner layer and an outer layer, said panel having a dimension suitable for wrapping around the lower leg;

a first fastener means affixed to said panel and extending outwardly therefrom, said first fastener means for affixing to said outer layer when said panel is wrapped around the lower leg; and a fetlock cradle sling strap having a first portion integrally connected to said panel and extending outwardly from an edge of said panel, said fetlock cradle sling strap having a fastener affixed to an end of said first portion opposite said edge, said first portion of said fetlock cradle sling strap having an upper edge curving outwardly from said edge of said panel at an approximately forty-five degree angle, said fetlock cradle sling strap having a bottom edge generally horizontally aligned with a bottom edge of said panel.

2. The protective support wrap of claim 1, said first portion of said fetlock cradle sling strap being integral with said outer layer of said panel.

3. The protective support wrap of claim 1, said fastener of said fetlock cradle sling strap being of a generally inelastic material.

4. The protective support wrap of claim 1, said first fastener means comprising:

a first strap of hook-and-loop material extending outwardly from said edge of said panel generally adjacent an upper edge of said panel; and a second strap of hook-and-loop material extending outwardly from said edge of said panel below said first strap, said first strap having an area approximately twice the area of said second strap.

5. The protective support wrap of claim 1, said inner layer being adhesively fastened in surface-to-surface contact with said outer layer.

6. The protective support wrap of claim 5, said inner layer being adhesively fastened to said outer layer across an entire surface of said inner layer.

7. The protective support wrap of claim 1, said inner layer having an upper edge and said outer layer having a top edge, said upper edge being secured to said top edge by cross-stitching.

8. The protective support wrap of claim 7, said inner layer having a lower edge, said outer layer having a bottom edge, said lower edge being secured to said bottom edge by cross-stitching.

9. The protective support wrap of claim 1, said inner layer having generally vertical side edges, said outer layer having generally vertical side edges, said side edges of said inner layer being directly stitched to said side edges of said outer layer.

10. The protective support wrap of claim 1, said panel having a side edge opposite said edge from which said fetlock cradle sling strap extends, said panel having a pair pleats formed in the inner and outer layers adjacent a bottom edge between the side edges, said pair of pleats defining an indented pocket in said panel.

11. A protective support wrap for a lower leg of a horse comprising:

a panel having an inner layer and an outer layer, said panel having a dimension suitable for wrapping around the lower leg, said inner layer having an upper edge and said outer layer having a top edge, said upper edge being secured to said top edge by cross-stitching, said inner layer having an entire surface adhesively fastened in surface-to-surface contact with said outer layer;

a first fastener means affixed to said panel and extending outwardly therefrom, said first fastener means for affixing to said outer layer when the panel is wrapped around the lower leg such that said inner layer contacts the lower leg of the horse; and a fetlock cradle sling strap extending outwardly from an edge of said panel, said fetlock cradle sling strap having a fastener affixed thereto.

12. A protective support wrap of claim 11, said inner layer lower leg of a edge, said outer layer having a bottom edge, said lower, edge behind secured to said bottom edge by cross-stitching.

13. The protective support wrap of claim 11, said inner layer having generally vertical side edges, said outer layer having generally vertical side edges, said side edges of said inner layer being stitched to said side edges of said outer layer.

14. The protective support wrap of claim 11, said panel having a side edge opposite said edge from which said fetlock cradle sling strap extends, said panel having a pair of pleats formed in the inner and outer layers adjacent a bottom edge between the side edges, said pair of pleats defining an indented pocket in said panel.

15. A protective support wrap for a lower leg of a horse comprising:

a panel having an inner layer and an outer layer, said panel having a dimension suitable for wrapping around the lower leg;

a first fastener means affixed to said panel and extending outwardly therefrom, said first fastener means for affixing to said outer layer when the panel is wrapped around the lower leg, said first fastener means comprising:

a first strap of hook-and-loop materials extending outwardly from a side edge of said panel generally adjacent an upper edge of said panel; and a second strap of hook-and-loop material extending outwardly from side edge of said edge of said panel immediately below said first strap, said first strap having an area approximately twice an area of said second strap; and a fetlock cradle sling strap connected to said panel and extending outwardly from the side edge of said panel, said fetlock cradle sling strap having a fastener affixed to an end opposite said side edge.

16. The protective support wrap of claim 15, said fetlock cradle sling strap having a portion intergal with said outer layer of said panel.

17. The protective support wrap of claim 15, said fetlock cradle sling strap having an upper edge extending outwardly from said side edge of said panel at an approximately forty-five degree angle.

* * * * *